（12） United States Patent
Puri et al.

(10) Patent No.: US 10,205,734 B2
(45) Date of Patent: Feb. 12, 2019

(54) NETWORK SAMPLING BASED PATH DECOMPOSITION AND ANOMALY DETECTION

(71) Applicant: ACCENTURE GLOBAL SOLUTIONS LIMITED, Dublin (IE)

(72) Inventors: Colin Anil Puri, San Jose, CA (US); Marco Alban-Hidalgo, Bangalore (IN); Sanghamitra Deb, Stanford, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 277 days.

(21) Appl. No.: 15/150,030

(22) Filed: May 9, 2016

(65) Prior Publication Data
US 2017/0324759 A1    Nov. 9, 2017

(51) Int. Cl.
H04L 29/06        (2006.01)
G06N 7/00         (2006.01)
(Continued)

(52) U.S. Cl.
CPC ...... H04L 63/1425 (2013.01); G06F 11/3476 (2013.01); G06F 21/554 (2013.01);
(Continued)

(58) Field of Classification Search
CPC . H04L 63/1425; H04L 63/14; H04L 63/1416; H04L 63/1408; G06N 7/005; G06F 21/56; G06F 21/57
See application file for complete search history.

(56) References Cited

U.S. PATENT DOCUMENTS 9,038,178 B1 * 5/2015 Lin .................. H04L 63/1416
                                                  709/224
2007/0226796 A1 * 9/2007 Gilbert ................ G06F 21/55
                                                  726/22
(Continued)

FOREIGN PATENT DOCUMENTS

EP    2863309    4/2015

OTHER PUBLICATIONS

Risto Vaarandi: "Tools and techniques for event log analysis", Jan. 1, 2005, 47 pages.

Primary Examiner — Hadi S Armouche
Assistant Examiner — Shaqueal D Wade
(74) Attorney, Agent, or Firm — Mannava & Kang, P.C.

(57) ABSTRACT

According to examples, network sampling based path decomposition and anomaly detection may include evaluating computer-generated log file data to generate a master network graph that specifies known events and transitions between the known events, and decomposing the master network graph to generate a representative network graph that includes a reduced number of paths of the master network graph. A source may be monitored to determine a cyber security threat by receiving incoming log file data related to the source, comparing the incoming log file data related to the source to the representative network graph, and determining, based on the comparison of the incoming log file data related to the source to the representative network graph, an anomaly in the representative network graph. Further, based on the monitoring, a report indicative of the cyber security threat may be generated based on the anomaly in the representative network graph.

20 Claims, 23 Drawing Sheets

(51) Int. Cl.
  *H04L 12/24* (2006.01)
  *G06F 11/34* (2006.01)
  *G06F 21/55* (2013.01)

(52) U.S. Cl.
  CPC ........... *G06N 7/005* (2013.01); *H04L 41/069* (2013.01); *H04L 63/20* (2013.01)

(56) References Cited

U.S. PATENT DOCUMENTS

| | | | |
|---|---|---|---|
| 2011/0252032 A1 | 10/2011 | Fitzgerald et al. | |
| 2014/0351564 A1* | 11/2014 | Bekas | G06F 9/3001 |
| | | | 712/222 |
| 2015/0047026 A1* | 2/2015 | Neil | H04L 63/1425 |
| | | | 726/22 |
| 2017/0180221 A1* | 6/2017 | Appel | H04L 43/067 |

\* cited by examiner

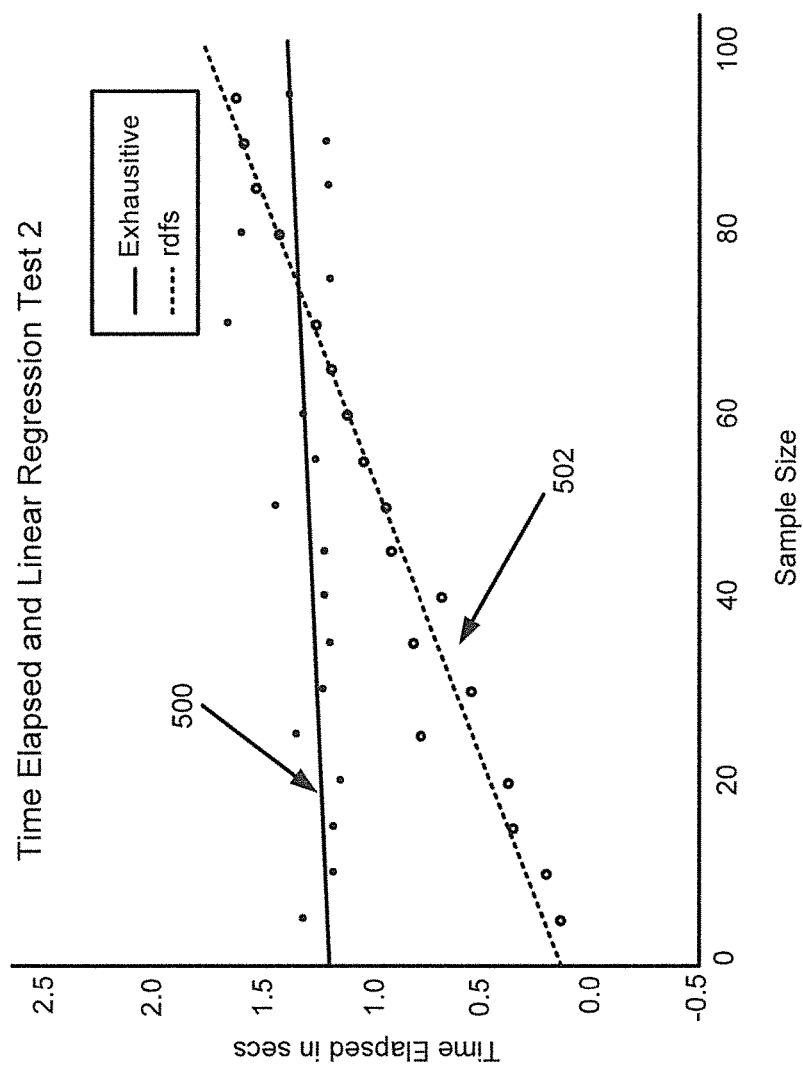

NETWORK SAMPLING BASED PATH DECOMPOSITION AND ANOMALY DETECTION

BACKGROUND

Enterprise environments typically generate log files to record a variety of activities. Sifting through the log file data sources to find errors and anomalies can be a daunting task, for example, due to the extensive volume of such log files. Analytics and semantic technologies may be applied to consume and analyze heterogeneous computer-generated log files to discover and extract relevant insights in a rationalized and structured form.

BRIEF DESCRIPTION OF DRAWINGS

Features of the present disclosure are illustrated by way of examples shown in the following figures. In the following figures, like numerals indicate like elements, in which:

FIG. 5 illustrates a timing graph with a linear interpolation for the network sampling based path decomposition and anomaly detection system of FIG. 1, according to an example of the present disclosure;

DETAILED DESCRIPTION

Figure 1:
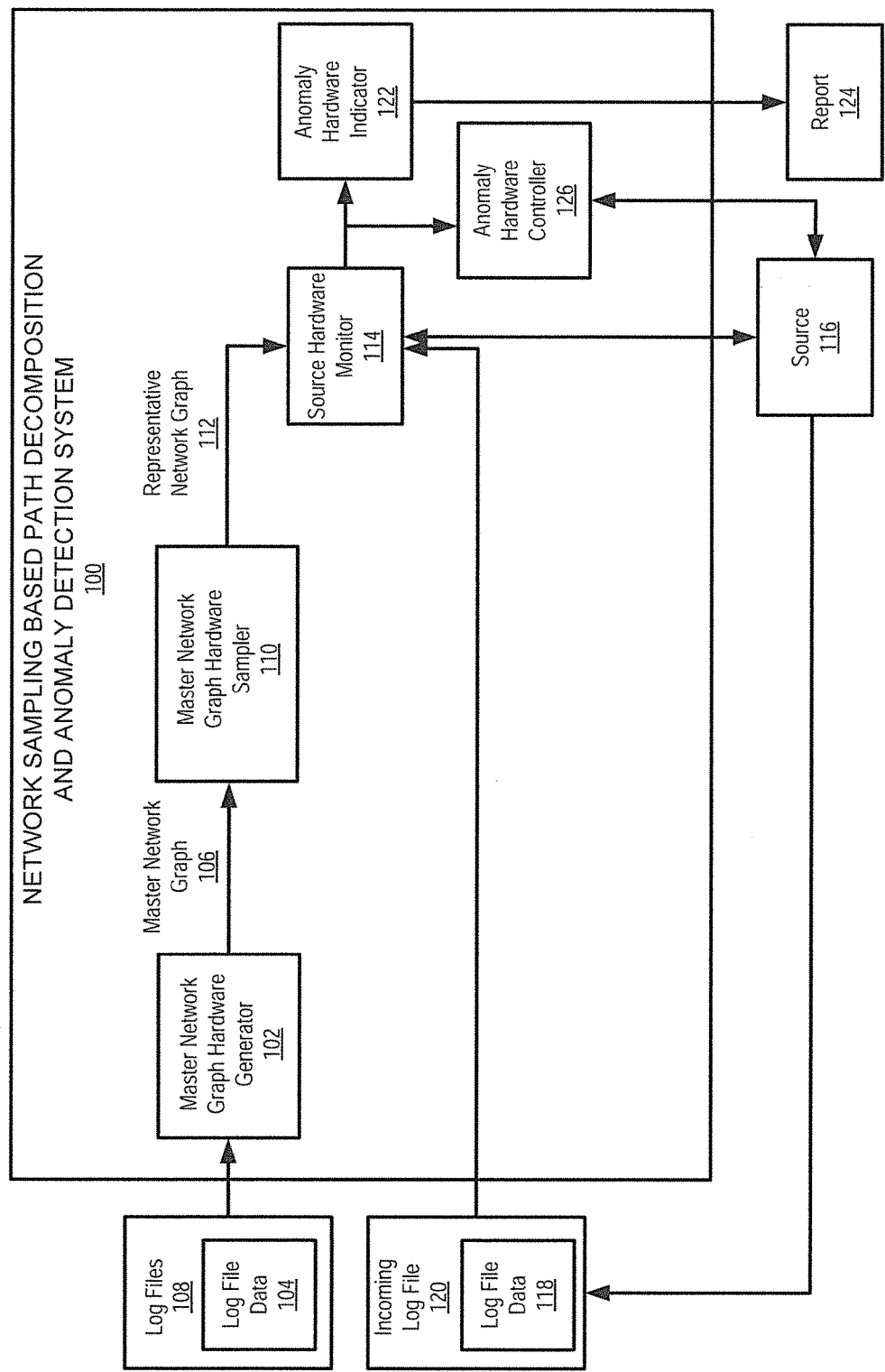
FIG. 1 illustrates a network sampling based path decomposition and anomaly detection system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data present in the contents of log files may be characterized by log traces with unique identifiers, time-stamps, events, and actions. These attributes may be indicative of underlying behaviors of applications, the processes that may interact with applications, and the subsequent patterns that exist and may have been created by a series of events. Through mining and correlation, the information contained within log files may be modeled as a graph with statistics, event states, and transition probabilities between events. Learning the behavior of applications through log file traces and understanding the flow of events that occur within applications can facilitate performance of analytics, for example, with regard to an enterprise environment.

The graph that models the log files may be relatively large, and may be described as a master network graph. According to examples, an aspect related to a network may include deriving a representative sample from the master network graph such that a representative network graph determined by using the derived representative sample may be utilized in place of the master network graph for operations that may otherwise be intractable. A variety of technical challenges related to derivation of the representative sample may include, for example, determining a suitable sampling technique, determining the properties that are sought to be represented in the representative network graph, determining a suitable (e.g., optimal) size of the representative network graph, determining metrics that are used to analyze the representative sample, determining how to quantify a confidence metric on the representative sample, and determining how to scale properties preserved by the representative sample to represent the master network graph.

In order to address the aforementioned technical challenges, according to examples, a network sampling based path decomposition and anomaly detection system and a method for network sampling based path decomposition and anomaly detection are disclosed herein. The system and method disclosed herein may provide for sampling of the distribution of the master network graph to produce a uniform view to retain both node and edge layout, while retaining probabilities of occurrence of a path in the master network graph. The system and method disclosed herein may provide for uniform sampling of the probability density of all walks that exist within a master graph and pulling, for example, of the top most average graph walks as representatives for a probability density range. During a walk through a graph, known probabilities for an inflight walk may be used to continue to prune and select most probable walks within a probability density bucket.

For a master network graph that may be described as a relatively large and highly connected graph with an unknown probability distribution of walks, the system and method disclosed herein may decompose the master network graph into a set of representative probable paths in sub-exponential time (i.e., in a time that is substantially less than exponential time). A walk may be described as a transition or a set of transitions from a start node of a graph to a stop node of the graph, and any intermediate nodes. A connection between two nodes in the graph may be described as a path. In this regard, the system and method disclosed herein may provide for the enumeration of all possible paths as a non-deterministic polynomial-time hard (NP-Hard) problem (i.e., where no solution is known in less than exponential time). That is, NP-hardness, in computational complexity theory, may be described as a class of problems that are, informally, "at least as hard as the hardest problems in NP" (i.e., a problem H is NP-hard when every problem L in NP can be reduced in polynomial time to H).

With respect to space complexity (e.g., based on a number of paths of a graph) which may also be exponential, mitigation of this complexity (e.g., by reducing the complexity of a graph) may add time needed to perform the mitigation. However, the system and method disclosed herein may minimize the overall time needed to analyze a graph by mitigating the complexity of the graph. The system and method disclosed herein may preserve the walk probability distribution of a master network graph as disclosed herein. Thus, for applications such as, for example, anomaly detection, a time of analysis and a number of paths analyzed may be reduced, for example, from 1000 paths to 10 paths.

With respect to a success metric, the system and method disclosed herein may produce a bounded set of walks such that the sampled distribution hits as many percentile buckets as possible as disclosed herein. Further, the system and method disclosed herein may achieve optimal results in time less than exhaustive.

The network sampling based path decomposition and anomaly detection system and the method for network sampling based path decomposition and anomaly detection disclosed herein provide a technical solution to technical problems related, for example, to analysis of a master network graph in time less than exhaustive, for example, by reducing memory usage related to storage of a model for the master network graph. In this regard, the reduced memory usage may also provide for faster processing, for example, for anomaly detection. In this regard, according to examples, a network sampling based path decomposition and anomaly detection system is disclosed herein and may include a master network graph generator to evaluate computer-generated log file data to generate a master network graph that specifies known events and transitions between the known events. A master network graph sampler may decompose the master network graph to generate a representative network graph that includes a reduced number of paths of the master network graph. The reduced number of paths may be selected with respect to probabilities of occurrence of the paths in the master network graph. A source monitor may monitor a source to determine a cyber security threat by receiving incoming log file data related to the source, comparing the incoming log file data related to the source to the representative network graph, and determining, based on the comparison of the incoming log file data related to the source to the representative network graph, an anomaly in the representative network graph. An anomaly indicator may generate, based on the monitoring, a report indicative of the cyber security threat based on the anomaly in the representative network graph. An anomaly controller may modify an operational characteristic of the source based on the anomaly in the representative network graph. The system and method disclosed herein may thus provide the technical solution of improved performance and reduced computing resource utilization with respect to components that are used for network sampling based path decomposition and anomaly detection. The system and method disclosed herein may provide uniform sampling and virtually constant monitoring of discovered information to prune the result set into a smaller representative graph the retains probability transitions and node connectivity (in/out degree). Thus, the system and method disclosed herein may reduce hard disk access, reduce memory usage, and provide a smaller more readable graph and set of walks.

FIG. 1 illustrates a network sampling based path decomposition and anomaly detection system 100 (e.g., system 100 as disclosed herein), according to an example of the present disclosure. Referring to FIG. 1, the system 100 may include a master network graph generator 102 to evaluate computer-generated log file data 104 to generate a master network graph 106 that specifies known events and transitions between the known events. The master network graph 106 may be generated by monitoring incoming trace events, and connecting probabilities of transitions between trace events based on unique identifiers that link trace events together in a master set of walks. The set of master walks may be combined into an aggregate view as a master network graph 106. The log file data 104 may be specified in log files 108 which may be evaluated to ascertain the log file data 104.

A master network graph sampler 110 may decompose the master network graph 106 to generate a representative network graph 112 that includes a reduced number of paths of the master network graph 106. The reduced number of paths may be selected with respect to probabilities of occurrence of the paths in the master network graph 106. According to examples, the master network graph sampler 110 may decompose the master network graph 106 to generate the representative network graph 112 that includes the reduced number of paths of the master network graph 106 by sampling the master network graph 106 to generate the representative network graph 112 that includes the reduced number of paths of the master network graph 106. According to examples, the master network graph sampler 110 may decompose the master network graph 106 to generate the representative network graph 112 that includes the reduced number of paths of the master network graph 106 by determining a sample size, executing, based on the sample size, a depth-first search on the master network graph 106, and retaining, based on the sample size, a predetermined number of paths that are located in the master network graph 106 in a bucket. The bucket may be described as a buffer or a storage location having a fixed or variable size. According to examples, the predetermined number of paths that are located in the master network graph 106 may be equal to the sample size.

According to examples, the master network graph sampler 110 may decompose the master network graph 106 to generate the representative network graph 112 that includes the reduced number of paths of the master network graph 106 by determining a further path (located in the master network graph 106) after the retained predetermined number of paths that are located in the master network graph 106, determining whether the further path is to be retained in the bucket, and in response to a determination that the further path is to be retained in the bucket, removing one of the retained predetermined number of paths from the bucket, and retaining, in place of the removed one of the retained predetermined number of paths from the bucket, the further path in the bucket.

According to examples, the master network graph sampler 110 may determine whether the further path is to be retained in the bucket by determining a probability related the further path and the retained predetermined number of paths, and in response to a determination that the probability related the further path and the retained predetermined number of paths meets a predetermined probability threshold (e.g., 70%, etc.), retaining the further path in the bucket.

According to examples, the master network graph sampler 110 may remove the one of the retained predetermined number of paths from the bucket by randomly selecting the one of the retained predetermined number of paths from the bucket.

A source monitor 114 may monitor a source 116 to determine a cyber security threat by receiving incoming log file data 118 (from an incoming log file 120) related to the source 116, comparing the incoming log file data 118 related to the source 116 to the representative network graph, and determining, based on the comparison of the incoming log file data 118 related to the source 116 to the representative network graph 112, an anomaly in the representative network graph 112. According to examples, the incoming log file data 118 may be computer-generated.

An anomaly indicator 122 may generate, based on the monitoring, a report 124 indicative of the cyber security threat based on the anomaly in the representative network graph 112.

An anomaly controller 126 may modify an operational characteristic of the source 116 based on the anomaly in the representative network graph 112. According to examples, the anomaly controller 126 may modify the operational characteristic of the source 116 (e.g., a characteristic related to how the source 116 is operating) based on the anomaly in the representative network graph by disconnecting the source 116 from a network associated with the source 116 (i.e., where the operational characteristic includes a communication characteristic of the source 116 with the network). In this regard, the source may be physically disconnected from a network, for example, by modifying a routing table, performing a statistical operation to compensate for activity from other systems in the network, etc. According to examples, the anomaly controller 126 may modify the operational characteristic of the source 116 based on the anomaly in the representative network graph 112 by performing a remedial measure that is selected from a set of remedial measures based on the anomaly in the representative network graph 112 (e.g., where operational characteristics may include increasing or decreasing bandwidth, blocking certain types of traffic, etc., and remedial measures may include requiring a password, modifying network connections, etc.).

As disclosed herein, the master network graph sampler 110 may execute a depth-first search on the master network graph 106, and retain the first n paths (e.g., predetermined number of paths) that are located. For the depth-first search, n may represent a sample size (e.g., 3 paths). For the $m^{th}$ path (e.g., $4^{th}$ path) such that m>n, the $m^{th}$ path may be retained in a bucket with probability n/m. An anomaly may represent something that does not match with what is learned in the master network graph 106 (e.g., a set of trace events forming a trace sequence that is very improbable with respect to what has been learned in the master network graph 106). A probability n/m=1 may be used to indicate that all paths in a bucket are to be sampled such that the sample set includes maximal coverage for that bucket. Otherwise, for the $m^{th}$ path such that m<n, further processing down the depth-first search for the particular path may be discontinued. In this regard, m may be less than n if a better path that is representative of a bucket is discovered, and m may be replaced with n. That is, paths per bucket may be continually updated and compared for probability performance, and low probability paths may be discarded. If the $m^{th}$ path is retained, one of the n paths that are previously retained may be replaced (uniformly at random) with the $m^{th}$ path that is retained. With respect to the aspect of uniformly at random, uniformity is ensured by randomly selecting nodes and paths to follow and retain. That is, if the $m^{th}$ path provides a better representation of a path that is already in the bucket, one of the n paths that are previously retained may be replaced (uniformly at random) with the $m^{th}$ path that is retained. The $m^{th}$ path provides a better representation of a path that is already in the bucket because uniformity is ensured by random selection as opposed to inadvertently favoring one path to remove or retain by consistently choosing the first path in a bucket to remove or retain.

With respect to uniformity, at any given point, the probability that a path is retained in a sample is n/m, where n is the sample, and m is a number of paths encountered thus far.

In order to prove uniformity, based on induction, for a base case, when n=m, each path with probability n/m=1 may be retained. For an inductive hypothesis, assuming that when the $m^{th}$ path is encountered, the sample includes paths with probability n/m, it may be shown that when the $(m+1)^{th}$ path arrives, the $(m+1)^{th}$ path may be retained with probability $$\frac{n}{m+1}.$$

Considering the arrival of the $(m+1)^{th}$ path, the $(m+1)^{th}$ path may be retained with probability $$\frac{n}{m+1}$$

by the master network graph sampler 110 (and similarly for paths that were already in the sample). The $(m+1)^{th}$ path with the probability $$\left(1 - \frac{n}{m+1}\right)$$

may be discarded. For $S_t$ as the sample at time t, if the $(m+1)^{th}$ path with the probability $$\left(1 - \frac{n}{m+1}\right)$$

is not discarded, then for element i already in the sample, element i with probability $$\frac{n-1}{n}$$

is not discarded. Thus, for $w_i \in S_t$, where $w^i$ represents the $i^{th}$ element in the sample at time t:

$$P[\text{time } t \to (t+1) \text{ keep } w_i] = \left(1 - \frac{n}{m+1}\right) + \left(\frac{n}{m+1}\right)\left(\frac{n-1}{n}\right)$$
$$= \frac{(m+1-n)}{m+1} + \frac{n-1}{m+1}$$
$$= \frac{m}{m+1}$$

By the inductive hypothesis, at the arrival of the $(m+1)^{th}$ path, all paths are in the sample with probability $n/m$, thus:

$$P[\text{kept } w_i \text{ at time}(t+1)] = \left(\frac{m}{m+1}\right)\left(\frac{n}{m}\right) = \frac{n}{m+1}$$

Figure 2:
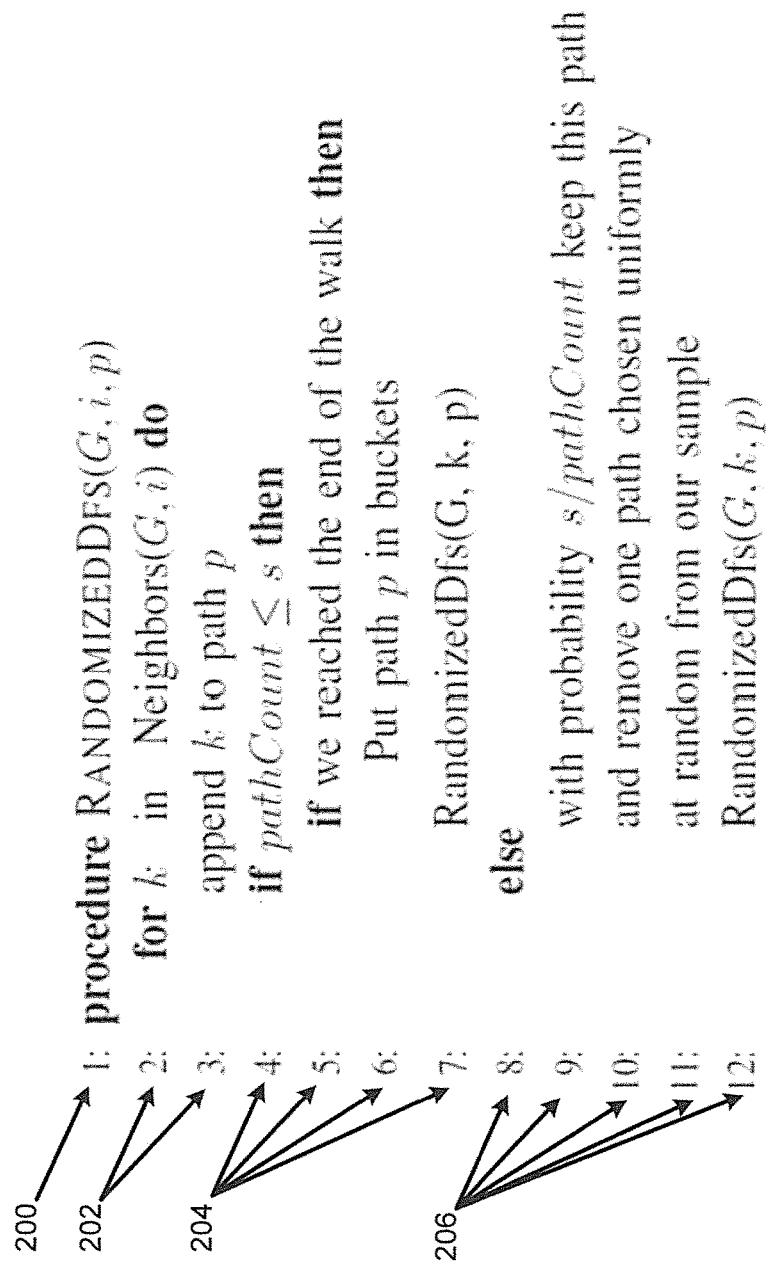
FIG. 2 illustrates pseudocode for implementing an aspect of the network sampling based path decomposition and anomaly detection system of FIG. 1, according to an example of the present disclosure.

FIG. 2 illustrates pseudocode for implementing an aspect of the system 100 (e.g., generating the representative network graph 112), according to an example of the present disclosure.

Referring to FIG. 2, at 200, the procedure may include "Randomized DFS (G,i,p)", where G represents the master graph, i represents a particular node, and p represents a path.

At 202, for k in Neighbors(G,i), k or the neighbor node for i may be appended to path p.

At 204, if pathCount≤s (i.e., where s, the total number of path samples, is equivalent to n), and if the end of the walk is reached, then path p is placed in a bucket.

Otherwise, at 206, with probability s/pathCount (equivalent to n/m as described herein), this path is retained and one path chosen uniformly at random is removed from the sample "Randomized DFS (G,k,p)".

Figure 3A:
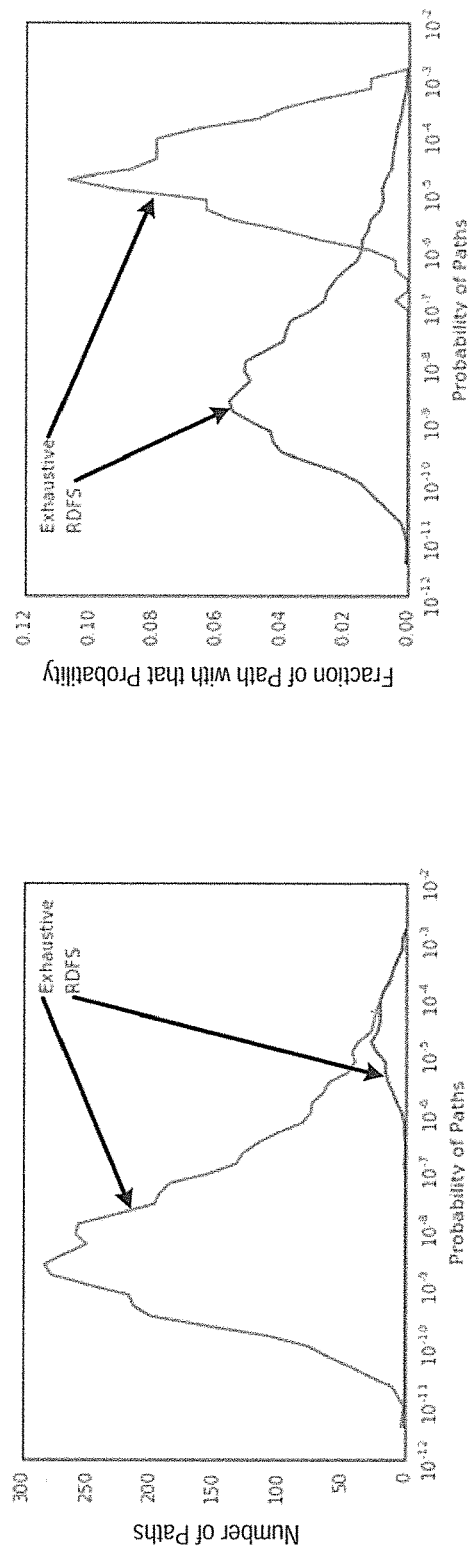
FIGS. 3A-3N illustrate graphs of a total number of paths for each percentile bucket, where the buckets are plotted in a logarithmic scale for the network sampling based path decomposition and anomaly detection system of FIG. 1, and a normalized distribution of the paths for each percentile bucket, where the buckets are plotted in a logarithmic scale for the network sampling based path decomposition and anomaly detection system of FIG. 1, according to an example of the present disclosure.
Figure 3B:
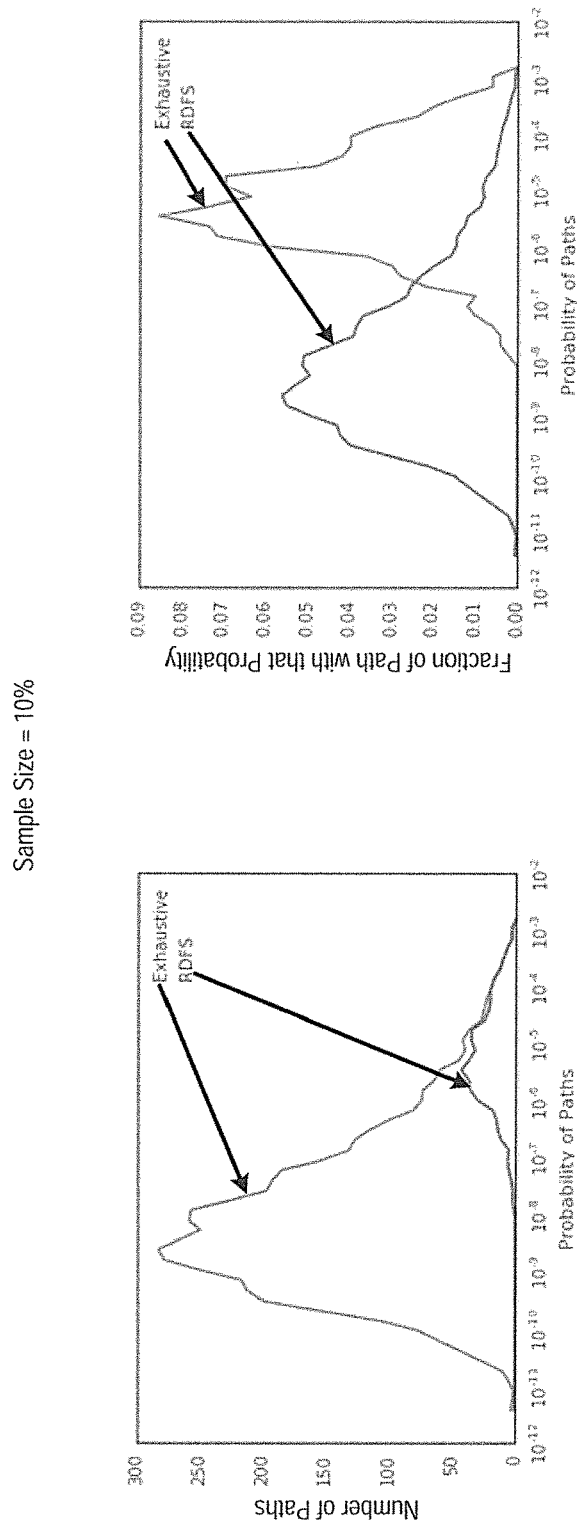
Figure 3C:
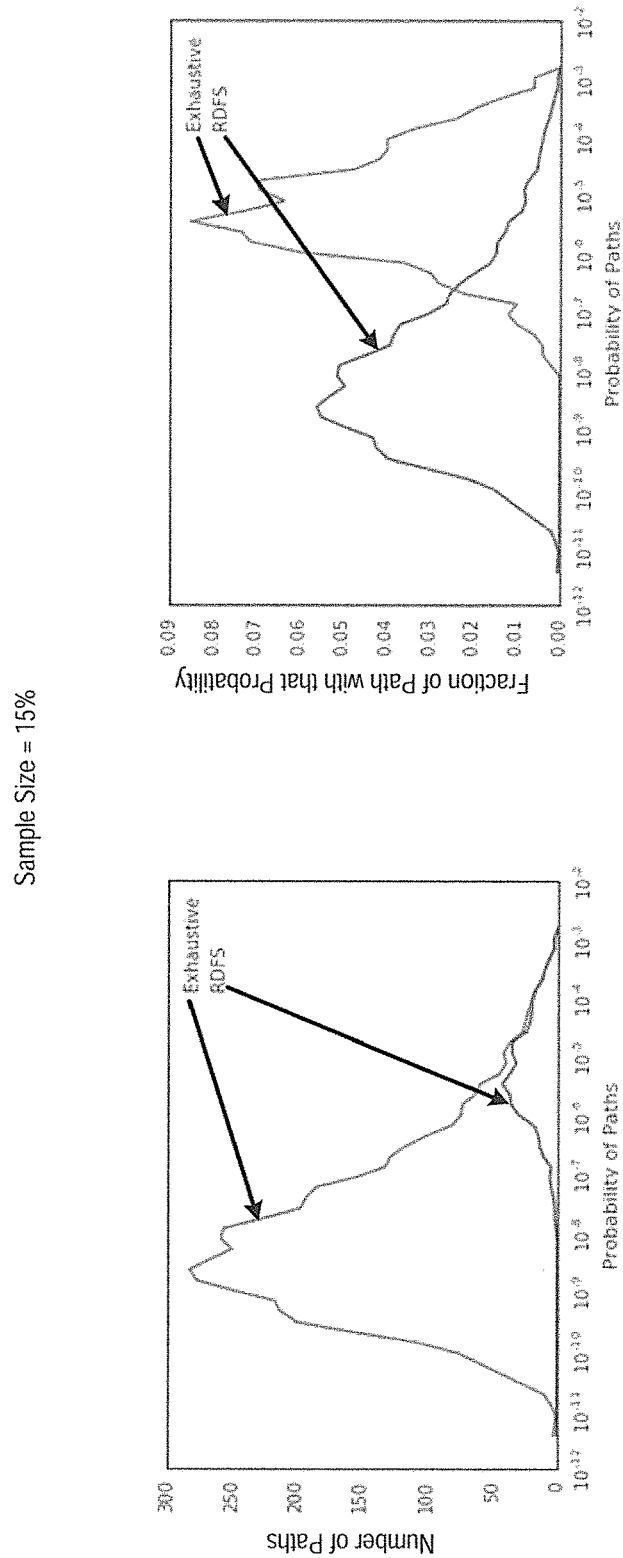
Figure 3D:
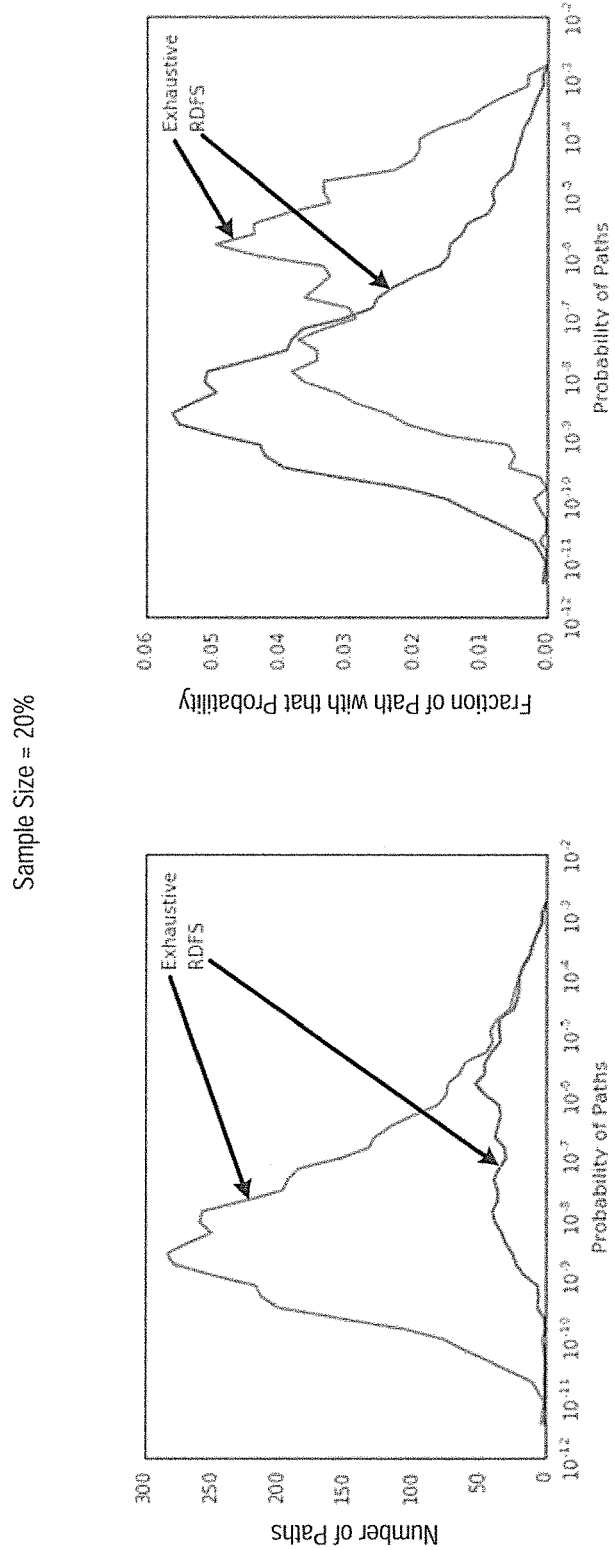
Figure 3E:
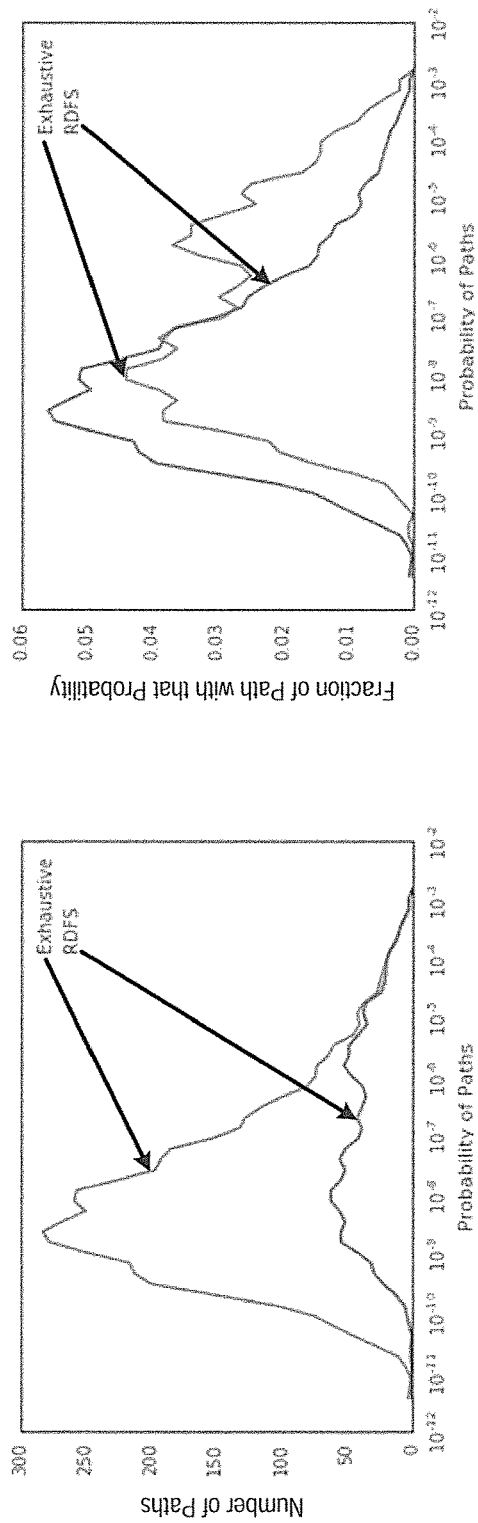
Figure 3F:
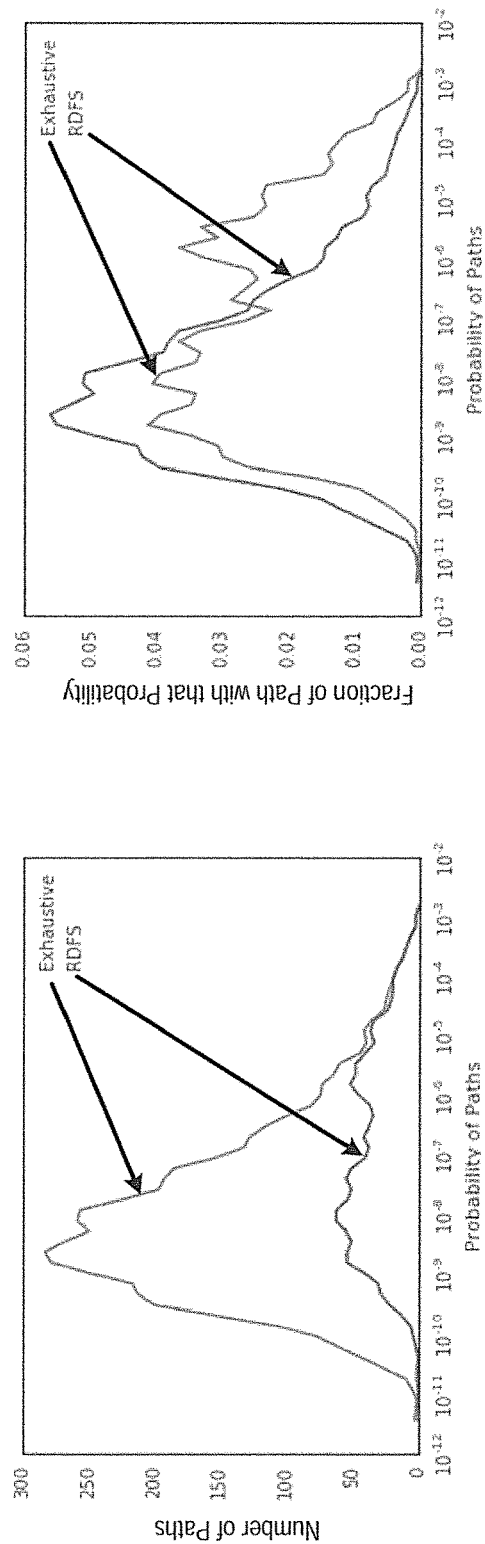
Figure 3G:
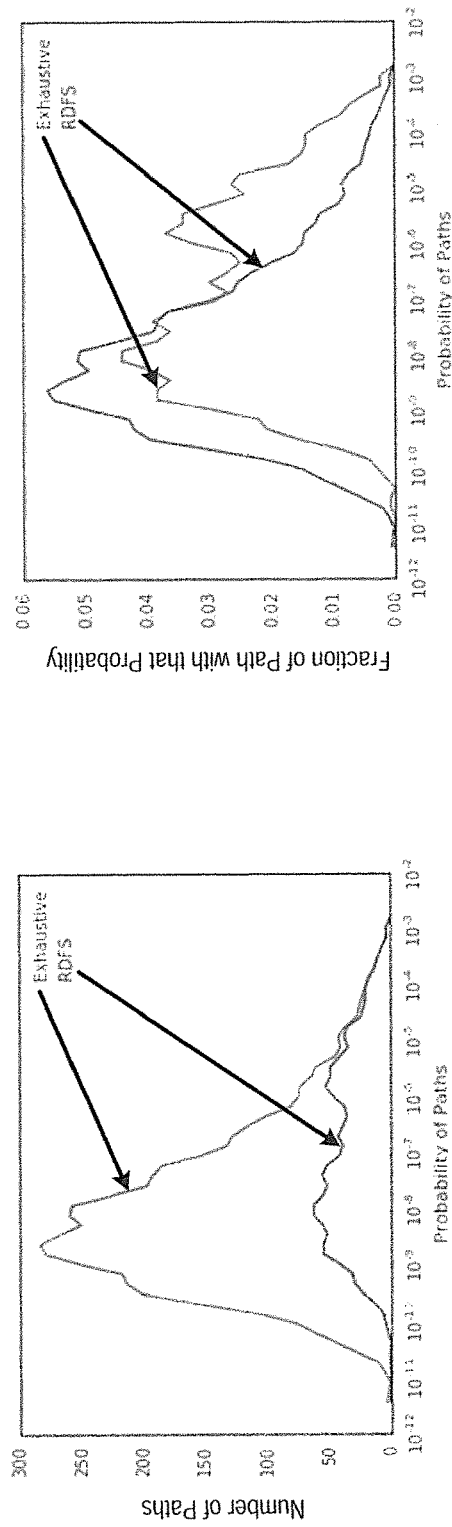
Figure 3H:
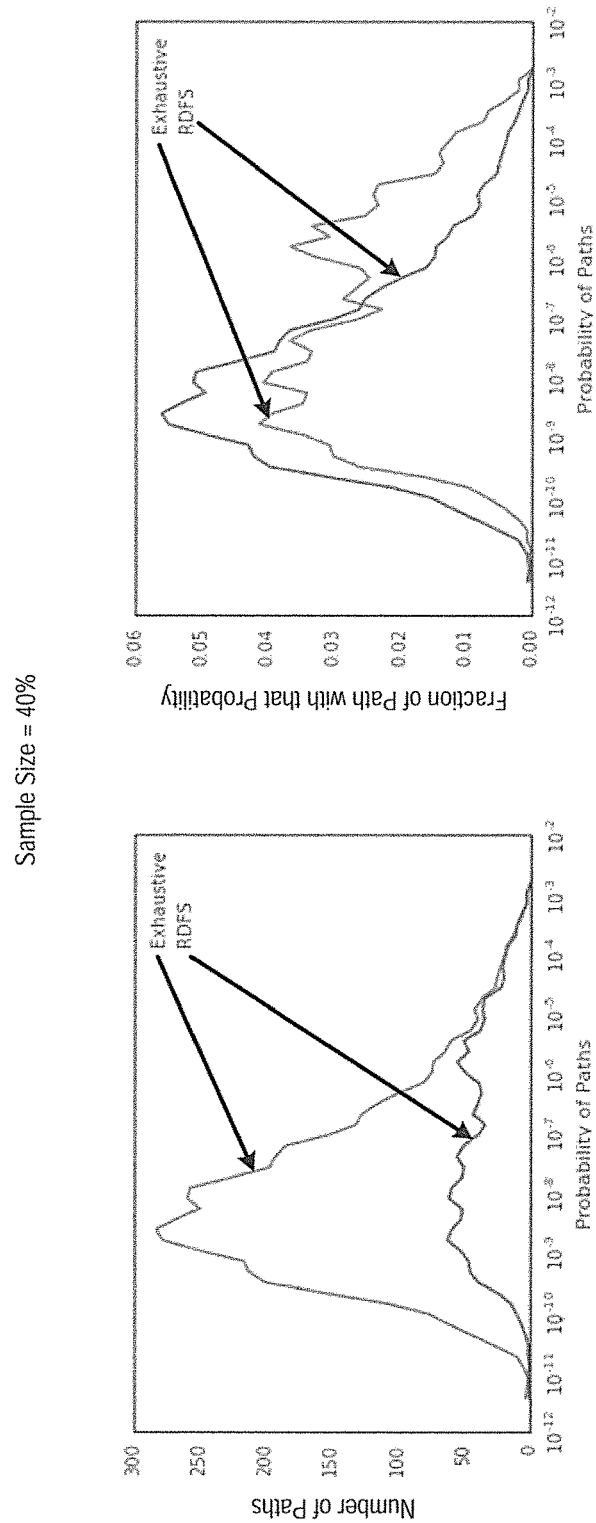
Figure 3I:
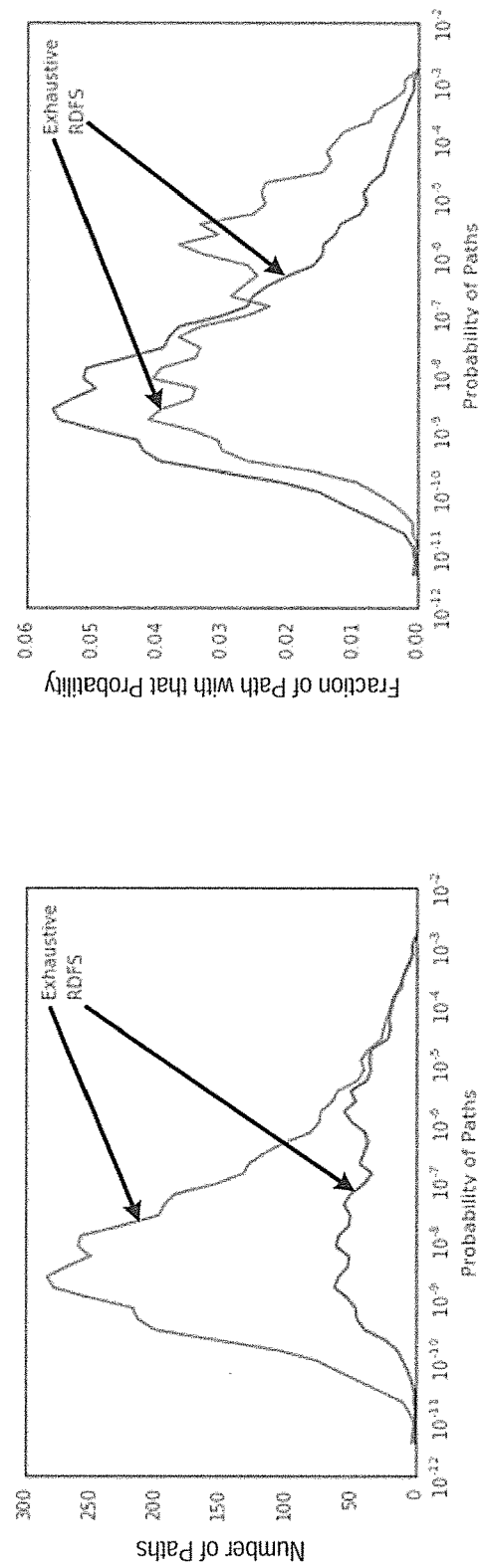
Figure 3J:
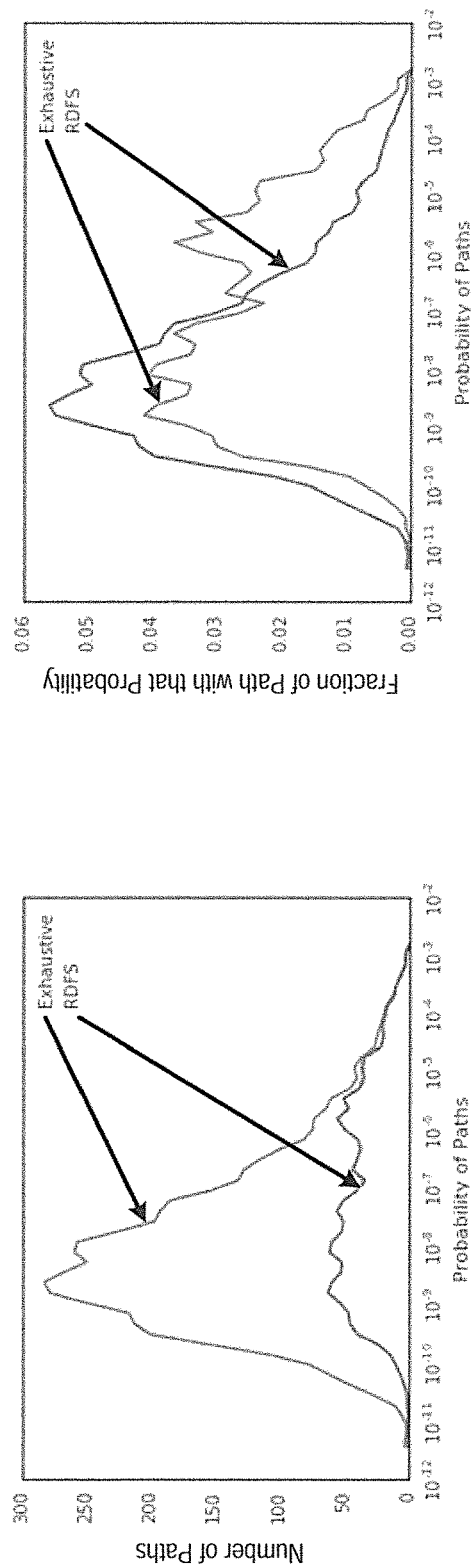
Figure 3K:
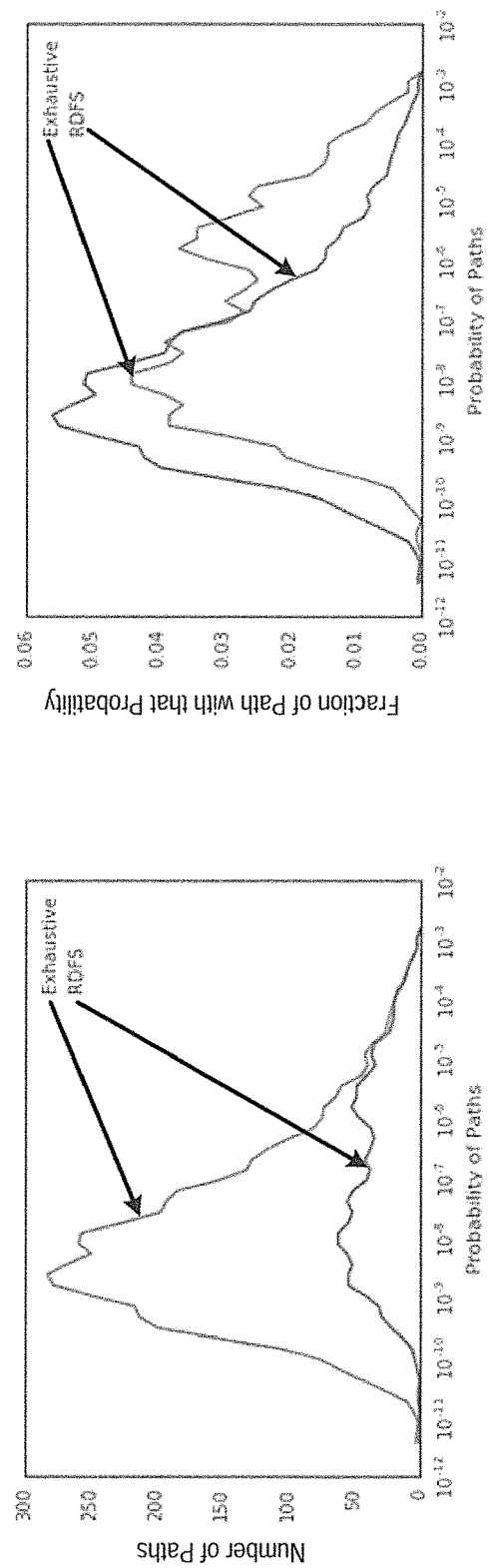
Figure 3L:
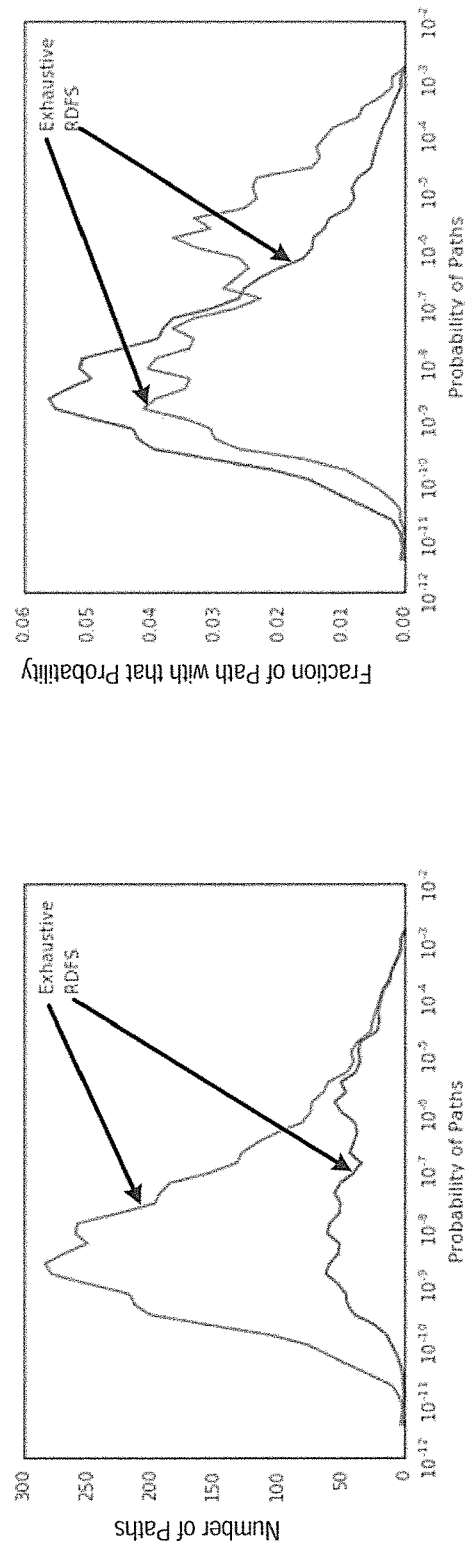
Figure 3M:
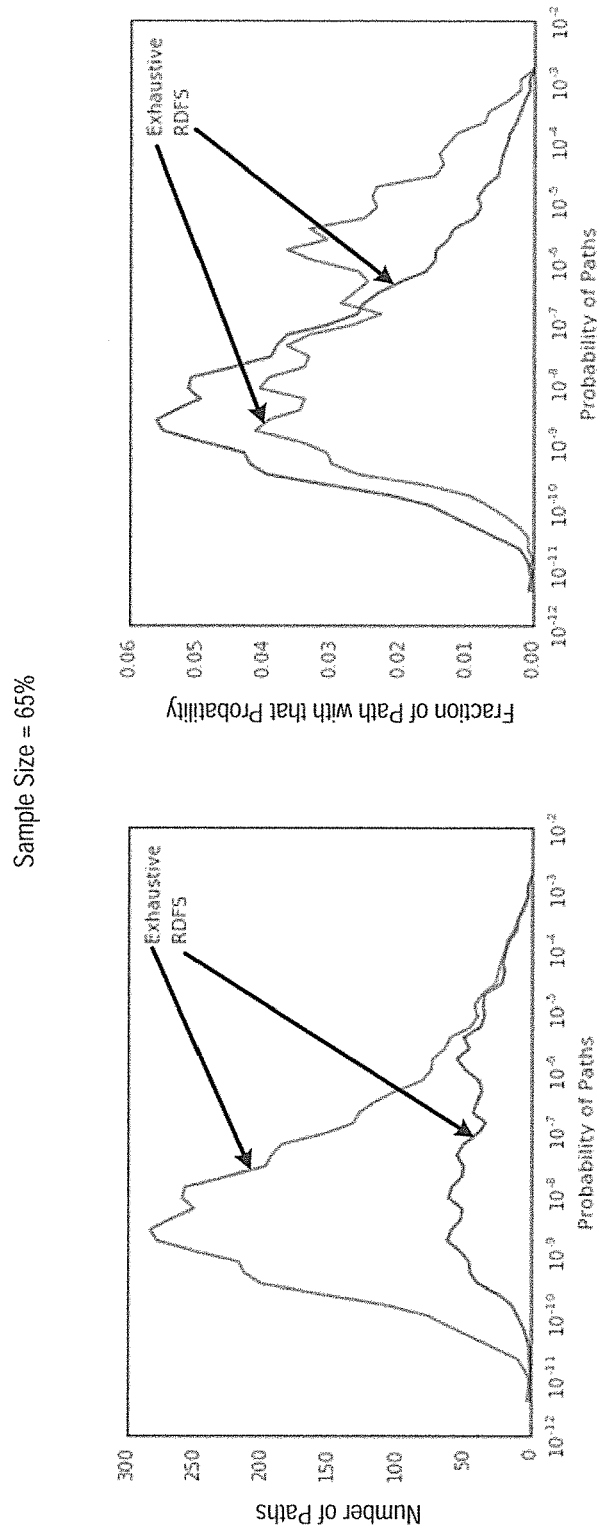
Figure 3N:
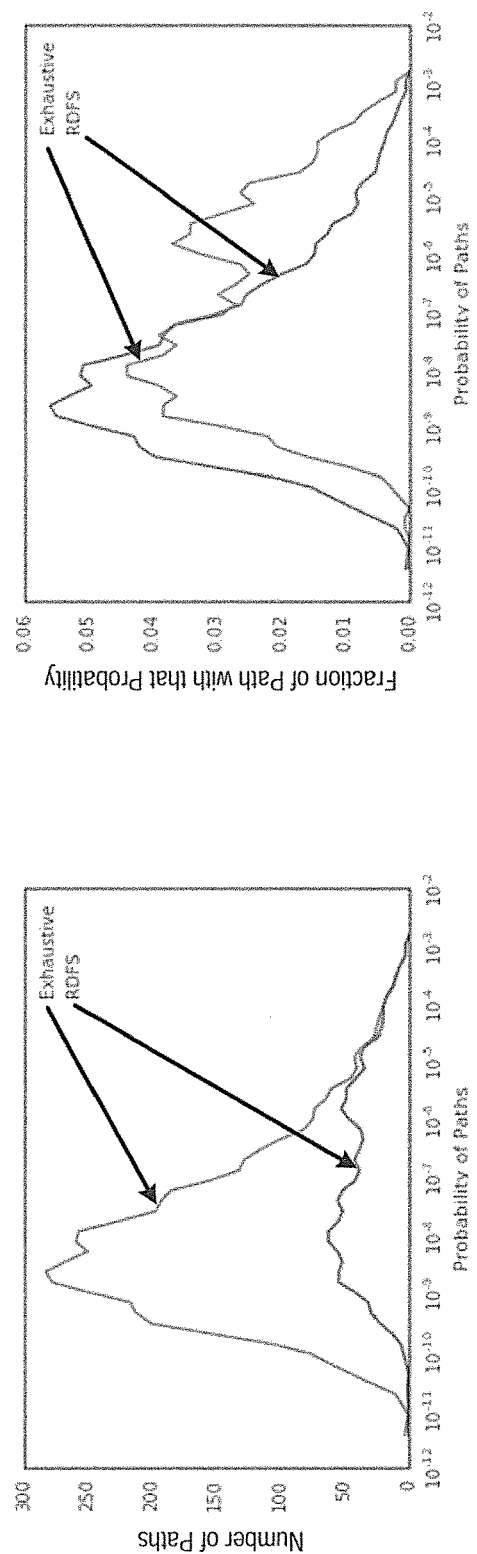

FIGS. 3A-3N illustrate graphs of a total number of paths for each percentile bucket, where the buckets are plotted in a logarithmic scale for the system 100 (e.g., see left side), and a normalized distribution of the paths for each percentile bucket, where the buckets are plotted in a logarithmic scale for the system 100 (e.g., see right side), according to an example of the present disclosure. For example, FIG. 3A shows the current number of paths for the discovered probability densities for a current iteration for a 5% sample size. The graph on the left side of FIG. 3A shows a number of paths versus probability of paths, and the graph on the right side of FIG. 3A shows a fraction of path with that probability versus probability of paths. For FIGS. 3A-3N, the discovered path probabilities and their numbers per bucket are depicted as "RDFS" (randomized depth-first search), while the example of the same graph searched exhaustively with the number of paths per bucket is shown for comparison as "Exhaustive".

Figures 4A, 4B:
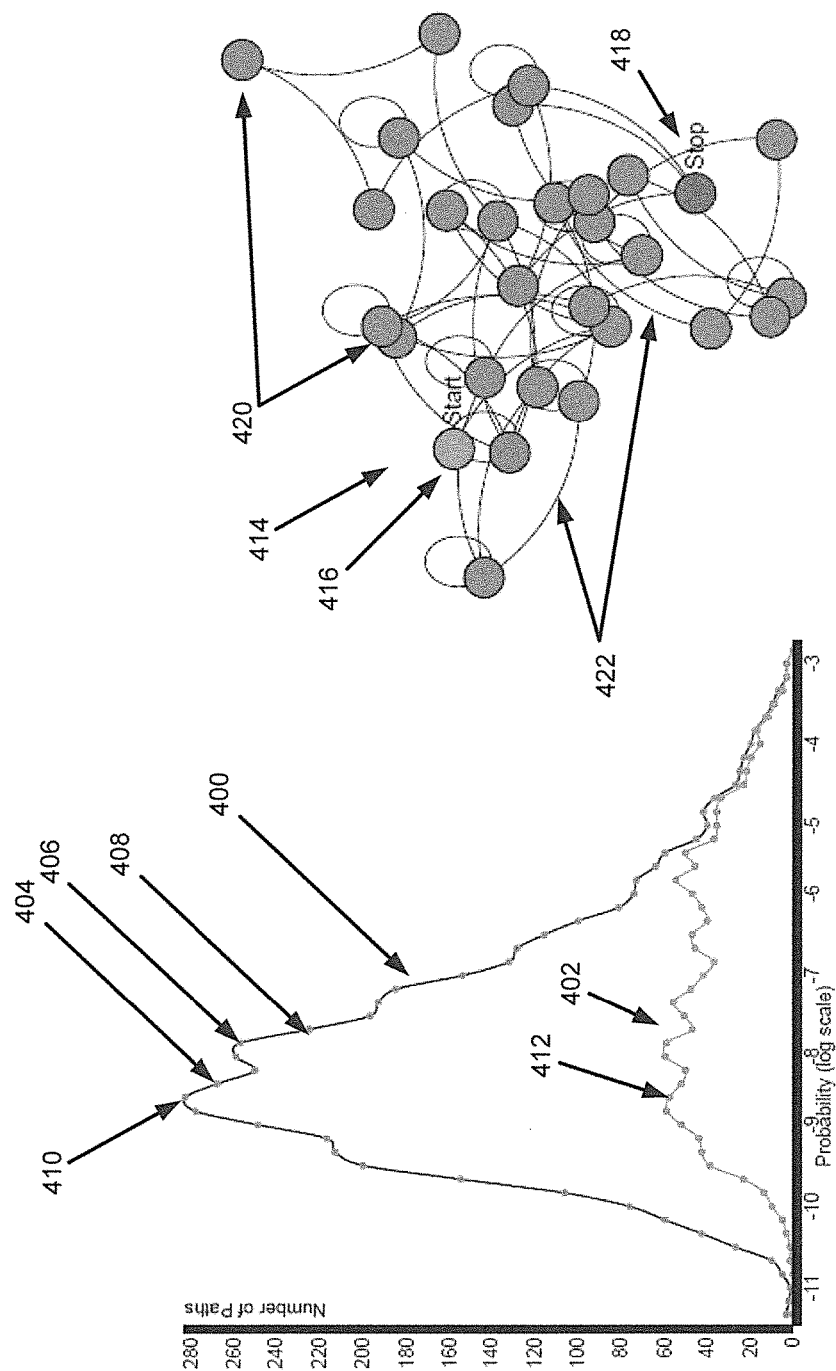
FIG. 4A illustrates histograms of a total number of paths for each percentile bucket, where the buckets are plotted in a logarithmic scale for the network sampling based path decomposition and anomaly detection system of FIG. 1.
FIG. 4B illustrates a representative network graph for the network sampling based path decomposition and anomaly detection system of FIG. 1, according to an example of the present disclosure.

FIG. 4A illustrates histograms of a total number of paths for each percentile bucket, where the buckets are plotted in a logarithmic scale for the system 100, and FIG. 4B illustrates a representative network graph 112 for the system 100, according to an example of the present disclosure.

Referring to FIG. 4A, the probability distribution for all paths per bucket for an exhaustive search is shown at 400 (e.g., the probability distribution for all paths for a master network graph 106), and the probability distribution for sampled data for the system 100 for a randomized depth-first search is shown at 402 (e.g., the probability distribution for paths for a representative network graph 112). Each bucket may be represented as a point, for example, at 404, 406, 408, etc. For the example of FIG. 4A, for the bucket at 410 that includes approximately 280 paths, the corresponding bucket at 412 for the system 100 may include approximately 60 paths, and thus a reduction of approximately 78%.

Referring to FIG. 4B, the finalized representative network graph 414 (e.g., the representative network graph 112 as described with reference to FIG. 1) may be derived from the probability distribution for sampled data for the system 100 for the randomized depth-first search shown at 402. Likewise, the finalized representative network graph 414 may be deconstructed to generate the probability distribution for sampled data for the system 100 for the randomized depth-first search shown at 402. For the finalized representative network graph 414, the start and stop nodes, for example, at 416 and 418, respectively, may be selected to determine operation of the finalized representative network graph 414. The network graph 414 may be used to model typical behaviors and behavior sequences that allow for inflight monitoring of situations for security purposes, or may be used for recommendation systems to provide more individualized results.

Nodes 420 of the finalized representative network graph 414 may represent different events (e.g., a log-in event, a log-off event, an access resource, etc.). The links 422 between the nodes 420 may represent paths, and probability values of transitions between events.

According to examples, for the example of FIGS. 4A and 4B, with respect to reduced usage of memory, the number of paths per bucket may be reduced, as disclosed herein, from approximately 280 paths at 410, to the approximately 60 paths at 412. In this regard, assuming that an incoming path (e.g., related to an incoming log file data 118) is being monitored at a network for anomalous activity (e.g., the incoming path represents a login from a particular machine), instead of comparing the incoming path to the approximately 280 paths at 410, the incoming path may be compared to the approximately 60 paths at 412. An incoming path may have its node attributes and transition attributes compared (e.g., probability values). In this regard, in addition to reduced usage of memory with respect to a model that represents various paths (e.g., a model that includes the sampled data for the system 100 for the randomized depth-first search shown at 402, and the corresponding finalized representative network graph 414), the processing time of data may also be reduced (e.g., the processing time for analyzing the incoming path relative to the approximately 60 paths at 412 is at least four (4) times faster compared to the processing time for analyzing the approximately 280 paths at 410).

FIG. 5 illustrates a timing graph with a linear interpolation for the system 100, according to an example of the present disclosure.

Referring to FIG. 5, for the exhaustive search shown at 500, it can be seen that as the sample size increases, the time elapsed for analyzing the master network graph 106 remains relatively steady, and at 502, the time elapsed for the depth-first search for analyzing the representative network graph 112 increases based on the sample size. Therefore, the sample size may be selected, for example, at an intermediate percentage (e.g., 30%) to reduce the time elapsed for analyzing the representative network graph 112.

Figure 6:
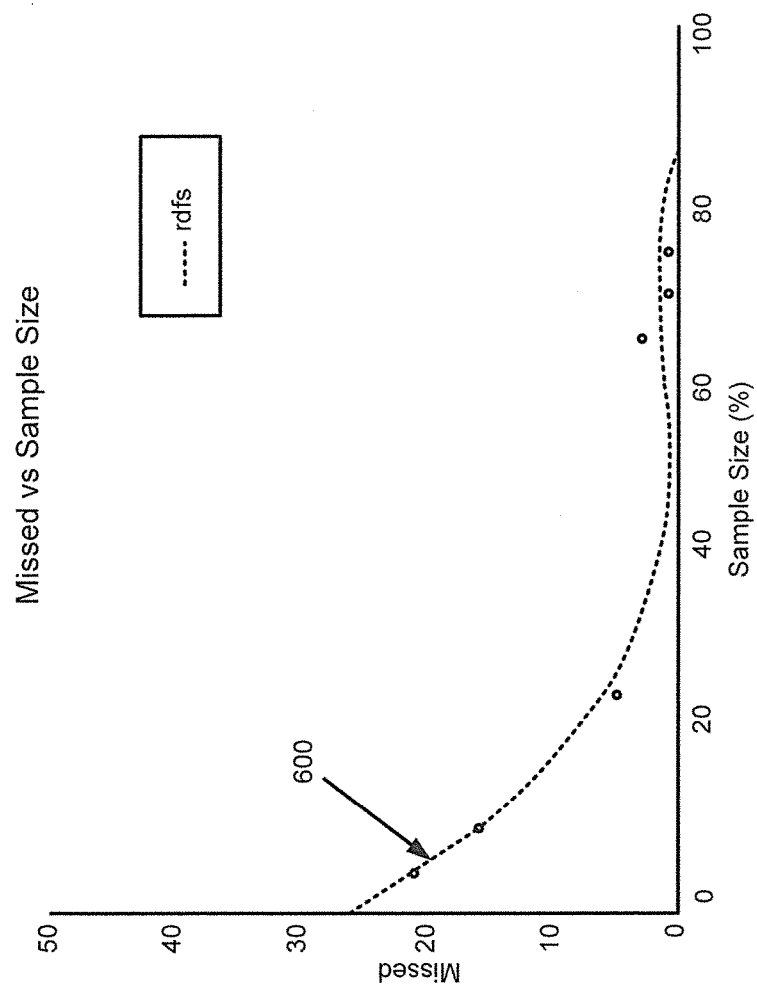
FIG. 6 illustrates a number of buckets missed versus a sample percentage for the network sampling based path decomposition and anomaly detection system of FIG. 1, according to an example of the present disclosure.

FIG. 6 illustrates a number of buckets missed versus a sample percentage for the system 100, according to an example of the present disclosure.

Referring to FIG. 6, for the depth-first search shown at 600, it can be seen that as the sample size increases, at approximately a 40% sample size, the number of buckets missed is approximately 0%. Thus, any further increase in the sample size would not further reduce the number of missed buckets.

Figure 7:
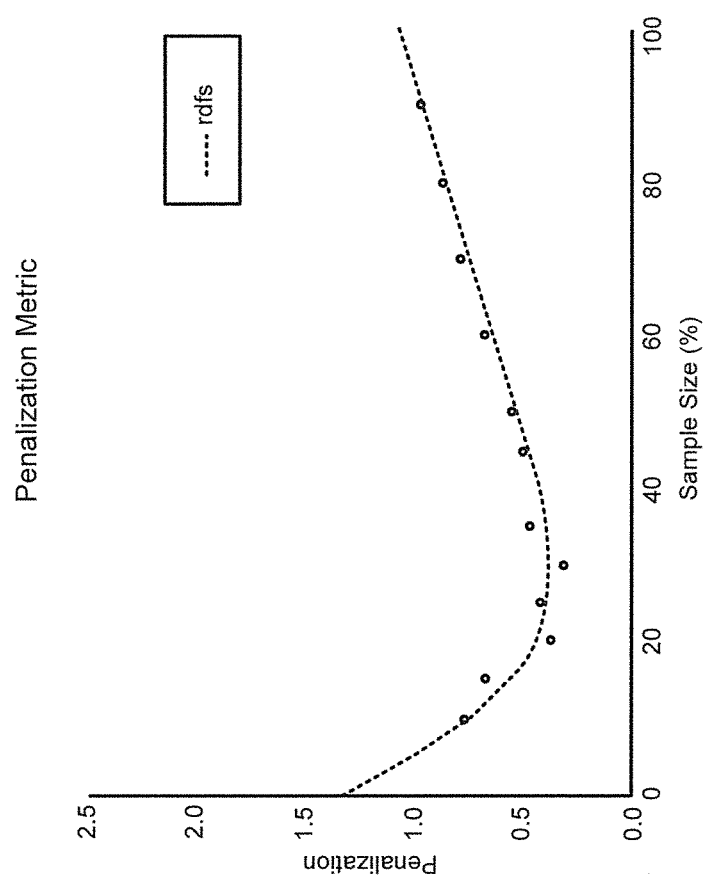
FIG. 7 illustrates penalization versus sample percentage for the network sampling based path decomposition and anomaly detection system of FIG. 1, according to an example of the present disclosure.

FIG. 7 illustrates a penalization metric versus sample percentage for the system 100, according to an example of the present disclosure.

The performance metric (i.e., penalization metric) may be a combination of how closely does a solution based on the system and method disclosed herein resemble a target distribution, and an amount of time used with respect to the sample percentage. According to examples, the system and method disclosed herein may provide for the best approximation and the least time elapsed. In this regard, a penalization metric may be defined as follows:

$$\rho = \sqrt{|B|^2 + |T|^2} \qquad \text{Equation (1)}$$

For Equation (1), |•| may represent the minimum-maximum normalization, B may represent the vector of buckets missed, and T may represent the vector of time elapsed. The performance metric may show how well or how much coverage a graph has with respect to how much time it took to produce a representative sample.

For the example of FIG. 6, an optimal solution may be obtained approximately 30-40% (e.g., by the local minima in the graphs).

According to examples, with respect to security data, for example, for log-in events, in order to determine whether a particular log-in event is anomalous, a path of the log-in event (e.g., a path from the log file data 118) in question may be compared to a finalized representative network graph (e.g., the representative network graph 112) that represents paths related to network activity. In this regard, the finalized representative network graph 112 may represent a model for analysis of different types of paths, such as the path of the log-in event in question. The finalized representative network graph 112 may be determined as a result of decomposition of a master network graph 106 (e.g., a graph that is used to determine the probability distribution for all paths per bucket for an exhaustive search as shown at 400). Based on the detection of an anomaly, for any data sources (e.g., a data source 116) that are being monitored (e.g., for determination of a cyber security threat), corrective actions such as generation of a report indicative of the cyber security threat, generation of an alert indicative of the cyber security threat, predetermined corrective actions (e.g., shutting down, placing in a secure mode, etc.) of the data sources and/or other components related to the data source, and other such actions, may be performed. Other examples of applications of the system and method disclosed herein may include security monitoring inflight for compound/complex behavior sequences, advertising monitoring for adaptive systems and for determining when a model needs to be relearned for a dynamic or evolving data set, etc.

As described herein, the elements of the system 100 may be machine readable instructions stored on a non-transitory computer readable medium. In addition, or alternatively, the elements of the system 100 may be hardware or a combination of machine readable instructions and hardware. For example, the master network graph sampler 110 may be designated as a master network graph hardware sampler 110. Similarly, the other elements of the system 100 may be designated as hardware elements.

Figure 8:
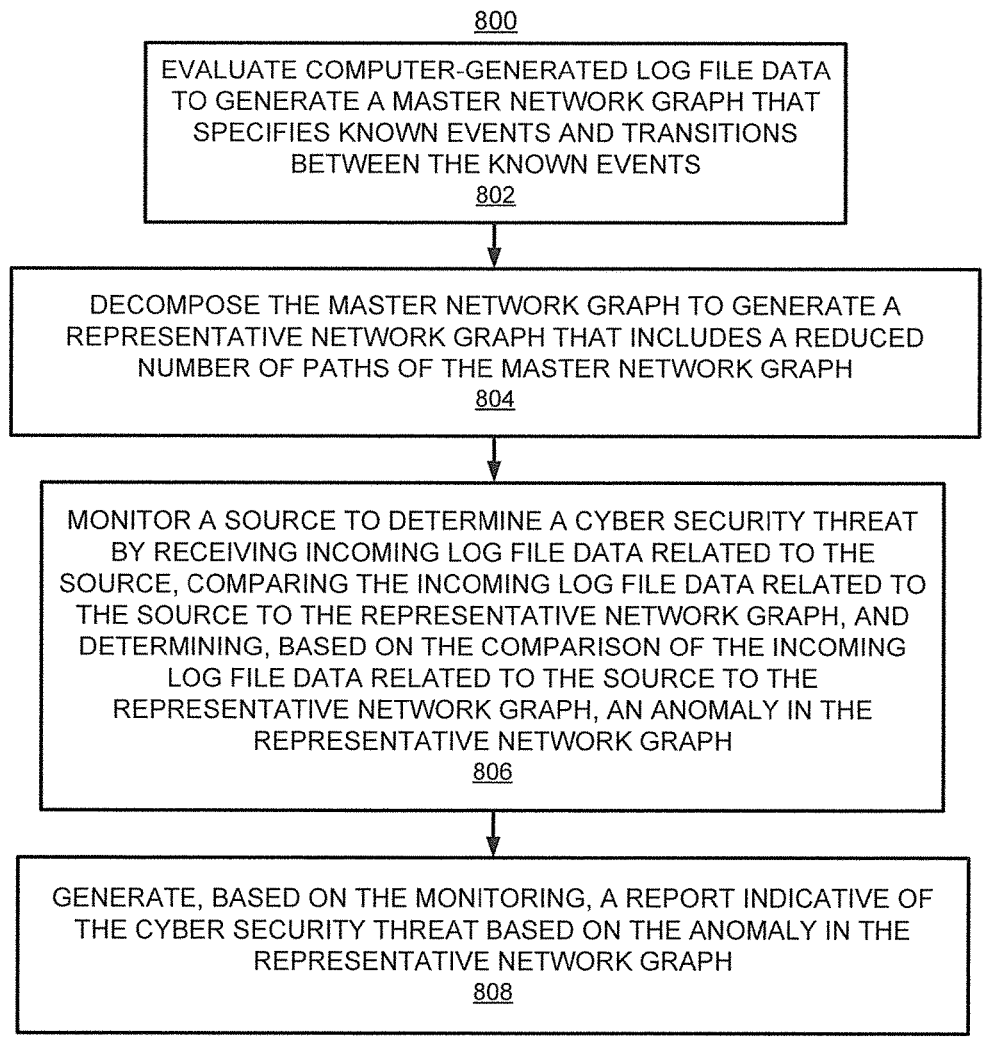
FIG. 8 illustrates a flowchart of a method for network sampling based path decomposition and anomaly detection, according to an example of the present disclosure.
Figure 9:
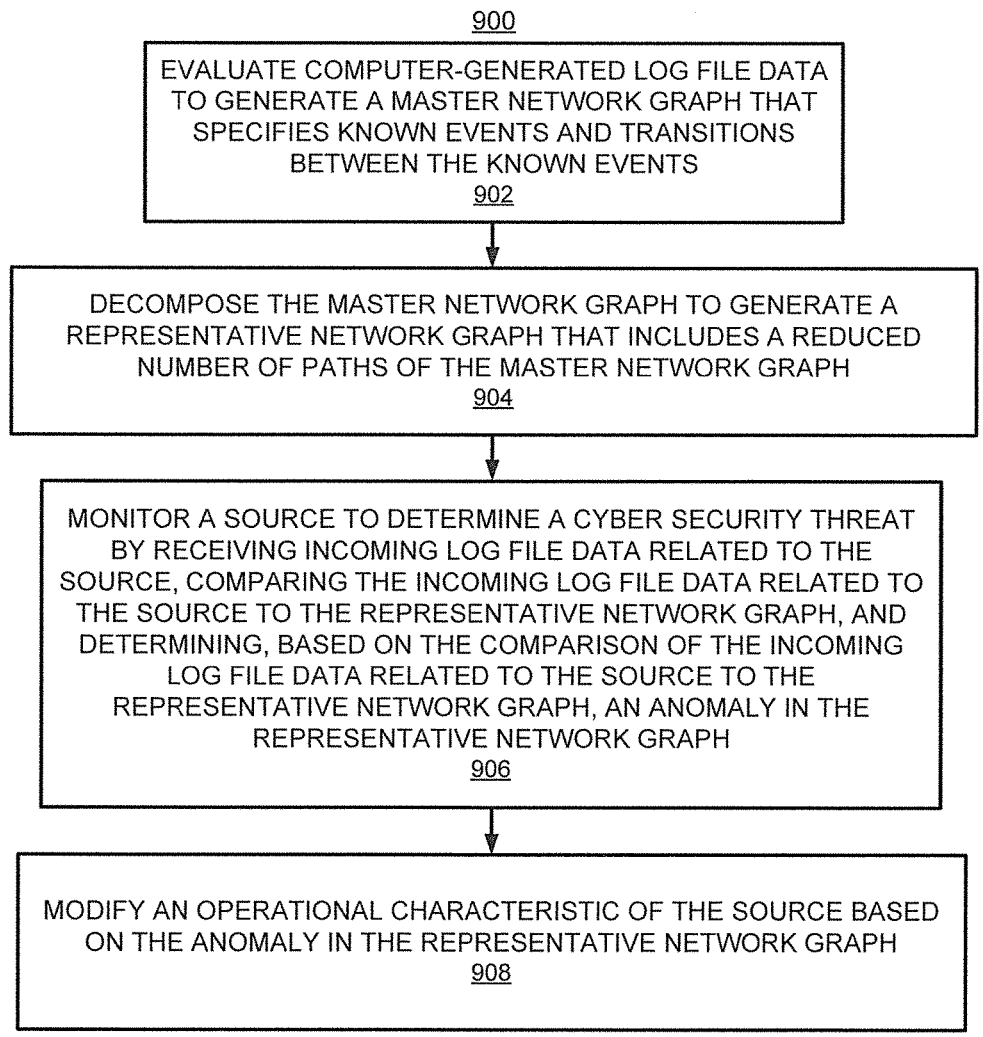
FIG. 9 illustrates another flowchart of a method for network sampling based path decomposition and anomaly detection, according to an example of the present disclosure.

FIGS. 8 and 9 respectively illustrate flowcharts of methods 800 and 900 for network sampling based path decomposition and anomaly detection, according to examples. The methods 800 and 900 may be implemented on the system 100 described above with reference to FIGS. 1-7 by way of example and not limitation. The methods 800 and 900 may be practiced in other systems.

Referring to FIGS. 1-8, and particularly FIG. 8, at block 802, the method 800 may include evaluating (e.g., by the master network graph generator 102) computer-generated log file data 118 to generate a master network graph 106 that specifies known events and transitions between the known events.

At block 804, the method 800 may include decomposing (e.g., by the master network graph sampler 110) the master network graph 106 to generate a representative network graph 112 that includes a reduced number of paths of the master network graph 106, where the reduced number of paths may be selected with respect to probabilities of occurrence of the paths in the master network graph 106.

At block 806, the method 800 may include monitoring (e.g., by the source monitor 114) a source 116 to determine a cyber security threat by receiving incoming log file data 118 related to the source 116, comparing the incoming log file data 118 related to the source 116 to the representative network graph 112, and determining, based on the comparison of the incoming log file data 118 related to the source 116 to the representative network graph 112, an anomaly in the representative network graph 112.

At block 808, the method 800 may include generating (e.g., by the anomaly indicator 122), based on the monitoring, a report 124 indicative of the cyber security threat based on the anomaly in the representative network graph 112.

According to examples, for the method 800, the master network graph sampler 110 may decompose the master network graph 106 to generate the representative network graph 112 that includes the reduced number of paths of the master network graph 106 by sampling the master network graph 106 to generate the representative network graph 112 that includes the reduced number of paths of the master network graph 106.

According to examples, the method 800 may include modifying (e.g., by the anomaly controller 126) an operational characteristic of the source 116 based on the anomaly in the representative network graph 112. According to examples, for the method 800, the anomaly controller 126 may modify the operational characteristic of the source 116 based on the anomaly in the representative network graph 112 by disconnecting the source 116 from a network associated with the source 116. According to examples, for the method 800, the anomaly controller 126 may modify the operational characteristic of the source 116 based on the anomaly in the representative network graph 112 by performing a remedial measure that is selected from a set of remedial measures based on the anomaly in the representative network graph 112.

According to examples, for the method 800, the master network graph sampler 110 may decompose the master network graph 106 to generate the representative network graph 112 that includes the reduced number of paths of the master network graph 106 by determining a sample size, executing, based on the sample size, a depth-first search on the master network graph 106, and retaining, based on the sample size, a predetermined number of paths that are located in the master network graph 106 in a bucket.

According to examples, for the method 800, the predetermined number of paths that are located in the master network graph 106 may be equal to the sample size.

According to examples, for the method 800, the master network graph sampler 110 may decompose the master network graph 106 to generate the representative network graph 112 that includes the reduced number of paths of the master network graph 106 by determining a further path after retaining the predetermined number of paths that are located in the master network graph 106, determining whether the further path is to be retained in the bucket, and in response to a determination that the further path is to be retained in the bucket, removing one of the retained predetermined number of paths from the bucket, and retaining, in place of the removed one of the retained predetermined number of paths, the further path in the bucket.

According to examples, for the method 800, the master network graph sampler 110 may determine whether the further path is to be retained in the bucket by determining a probability related to the further path and the retained predetermined number of paths, and in response to a determination that the probability related to the further path and the retained predetermined number of paths meets a predetermined probability threshold, retaining the further path in the bucket.

According to examples, for the method 800, the master network graph sampler 110 may remove the one of the retained predetermined number of paths from the bucket by randomly selecting the one of the retained predetermined number of paths from the bucket.

Referring to FIGS. 1-7 and 9, and particularly FIG. 9, at block 902, the method 900 may include evaluating, by the master network graph generator 102, computer-generated log file data 118 to generate a master network graph 106 that specifies known events and transitions between the known events.

At block 904, the method 900 may include decomposing, by the master network graph sampler 110, the master network graph 106 to generate a representative network graph 112 that includes a reduced number of paths of the master network graph 106, where the reduced number of paths may be selected with respect to probabilities of occurrence of the paths in the master network graph 106.

At block 906, the method 900 may include monitoring, by the source monitor 114, a source 116 to determine a cyber security threat by receiving incoming log file data 118 related to the source 116, comparing the incoming log file data 118 related to the source 116 to the representative network graph 112, and determining, based on the comparison of the incoming log file data 118 related to the source 116 to the representative network graph 112, an anomaly in the representative network graph 112.

At block 908, the method 900 may include modifying, by the anomaly controller 126, an operational characteristic of the source 116 based on the anomaly in the representative network graph 112.

According to examples, the method 900 may include generating, by the anomaly indicator 122, based on the monitoring, a report 124 indicative of the cyber security threat based on the anomaly in the representative network graph 112.

According to examples, for the method 900, decomposing the master network graph 106 to generate the representative network graph 112 that includes the reduced number of paths of the master network graph 106 may further include sampling the master network graph 106 to generate the representative network graph 112 that includes the reduced number of paths of the master network graph 106.

According to examples, for the method 900, decomposing the master network graph 106 to generate the representative network graph 112 that includes the reduced number of paths of the master network graph 106 may further include determining a sample size, executing, based on the sample size, a depth-first search on the master network graph 106, and retaining, based on the sample size, a predetermined number of paths that are located in the master network graph 106 in a bucket.

According to examples, for the method 900, decomposing the master network graph 106 to generate the representative network graph 112 that includes the reduced number of paths of the master network graph 106 may further include determining a further path after retaining the predetermined number of paths that are located in the master network graph 106, determining whether the further path is to be retained in the bucket, and in response to a determination that the further path is to be retained in the bucket removing one of the retained predetermined number of paths from the bucket, and retaining, in place of the removed one of the retained predetermined number of paths, the further path in the bucket.

According to examples, for the method 900, determining whether the further path is to be retained in the bucket may further include determining a probability related to the further path and the retained predetermined number of paths, and in response to a determination that the probability related to the further path and the retained predetermined number of paths meets a predetermined probability threshold, retaining the further path in the bucket.

According to examples, network sampling based path decomposition and anomaly detection may include receiving a master network graph 106 that specifies known events and transitions between the known events, and decomposing the master network graph 106 to generate a representative network graph 112 that includes a reduced number of paths of the master network graph 106, where the reduced number of paths may be selected with respect to probabilities of occurrence of the paths in the master network graph 106. According to examples, network sampling based path decomposition and anomaly detection may further include receiving incoming log file data 118, comparing the incoming log file data 118 to the representative network graph 112, and determining, based on the comparison of the incoming log file data 118 to the representative network graph 112, an anomaly in the representative network graph 112.

According to examples, decomposing the master network graph 106 to generate the representative network graph 112 that includes the reduced number of paths of the master network graph 106 may further include determining a sample size, executing, based on the sample size, a depth-first search on the master network graph 106, and retaining, based on the sample size, a predetermined number of paths that are located in the master network graph 106 in a bucket.

According to examples, decomposing the master network graph 106 to generate the representative network graph 112 that includes the reduced number of paths of the master network may further include determining a further path after retaining the predetermined number of paths that are located in the master network graph 106, determining whether the further path is to be retained in the bucket, and in response to a determination that the further path is to be retained in the bucket removing one of the retained predetermined number of paths from the bucket, and retaining, in place of the removed one of the retained predetermined number of paths, the further path in the bucket.

According to examples, determining whether the further path is to be retained in the bucket may further include determining a probability related to the further path and the retained predetermined number of paths, and in response to a determination that the probability related to the further path and the retained predetermined number of paths meets a predetermined probability threshold, retaining the further path in the bucket.

Figure 10:
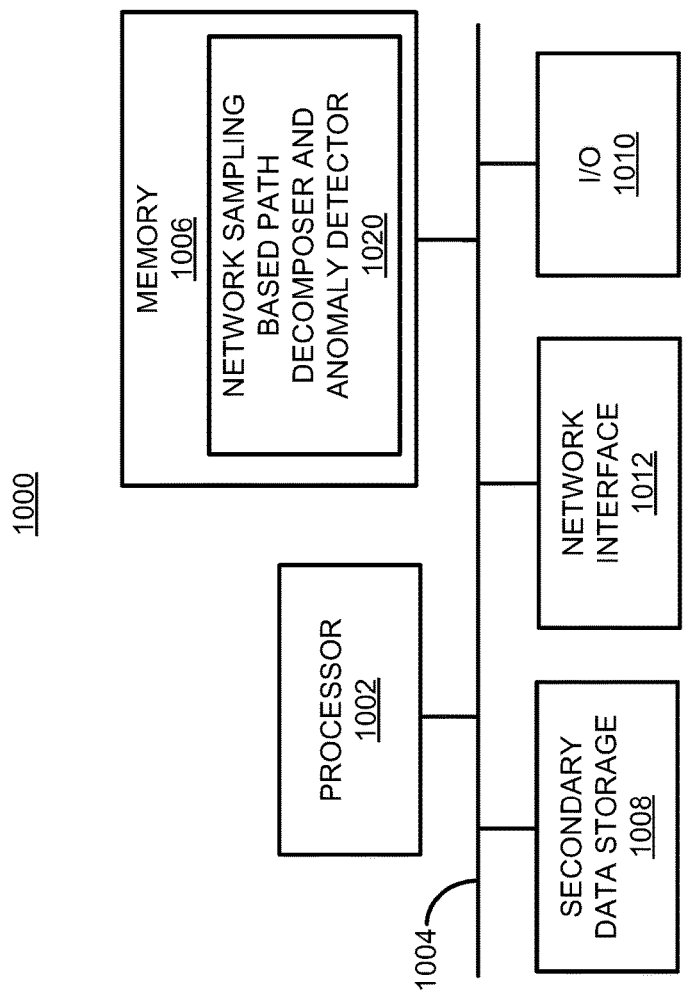
FIG. 10 illustrates a computer system, according to an example of the present disclosure.

FIG. 10 shows a computer system 1000 that may be used with the examples described herein. The computer system may represent a generic platform that includes components that may be in a server or another computer system. The computer system 1000 may be used as a platform for the system 100. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1000 may include a processor 1002 that may implement or execute machine readable instructions performing some or all of the methods, functions and other processes described herein. Commands and data from the processor 1002 may be communicated over a communication bus 1004. The computer system may also include a main memory 1006, such as a random access memory (RAM), where the machine readable instructions and data for the processor 1002 may reside during runtime, and a secondary data storage 1008, which may be non-volatile and stores machine readable instructions and data. The memory and data storage are examples of computer readable mediums. The memory 1006 may include a network sampling based path decomposer and anomaly detector 1020 including machine readable instructions residing in the memory 1006 during runtime and executed by the processor 1002. The network sampling based path decomposer and anomaly detector 1020 may include the elements of the network sampling based path decomposition and anomaly detection system 100 shown with reference to FIGS. 1-9.

The computer system 1000 may include an I/O device 1010, such as a keyboard, a mouse, a display, etc. The computer system may include a network interface 1012 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A network sampling based path decomposition and anomaly detection system comprising:
at least one hardware processor:
a master network graph generator, executed by the at least one hardware processor, to evaluate computer-generated log file data to generate a master network graph that specifies known events and transitions between the known events;
a master network graph sampler, executed by the at least one hardware processor, to decompose the master network graph to generate a representative network graph that includes a reduced number of paths of the master network graph, wherein the reduced number of paths are selected with respect to probabilities of occurrence of the paths in the master network graph;
a source monitor, executed by the at least one hardware processor, to monitor a source to determine a cyber security threat by
receiving incoming log file data related to the source,
comparing the incoming log file data related to the source to the representative network graph, and
determining, based on the comparison of the incoming log file data related to the source to the representative network graph, an anomaly in the representative network graph;
an anomaly indicator, executed by the at least one hardware processor, to generate, based on the monitoring, a report indicative of the cyber security threat based on the anomaly in the representative network graph; and
an anomaly controller, executed by the at least one hardware processor, to modify an operational characteristic of the source based on the anomaly in the representative network graph by at least one of
disconnecting the source from a network associated with the source by at least one of
modifying a routing table associated with the source, or
performing a statistical operation to compensate for activity from other systems in the network, wherein the operational characteristic related to disconnection of the source from the network includes a communication characteristic of the source with the network, or
performing a remedial measure that is selected from a set of remedial measures based on the anomaly in the representative network graph, wherein the operational characteristic related to performance of the remedial measure includes at least one of
increasing or decreasing bandwidth associated with the source, or
blocking specified traffic to the source.

2. The network sampling based path decomposition and anomaly detection system according to claim 1, wherein the master network graph sampler is to decompose the master network graph to generate the representative network graph that includes the reduced number of paths of the master network graph by sampling the master network graph to generate the representative network graph that includes the reduced number of paths of the master network graph.

3. The network sampling based path decomposition and anomaly detection system according to claim 1, wherein the master network graph sampler is to decompose the master network graph to generate the representative network graph that includes the reduced number of paths of the master network graph by
determining a sample size,
executing, based on the sample size, a depth-first search on the master network graph, and
retaining, based on the sample size, a predetermined number of paths that are located in the master network graph in a bucket.

4. The network sampling based path decomposition and anomaly detection system according to claim 3, wherein the predetermined number of paths that are located in the master network graph is equal to the sample size.

5. The network sampling based path decomposition and anomaly detection system according to claim 3, wherein the master network graph sampler is to decompose the master network graph to generate the representative network graph that includes the reduced number of paths of the master network graph by
  determining a further path after retaining the predetermined number of paths that are located in the master network graph,
  determining whether the further path is to be retained in the bucket, and
  in response to a determination that the further path is to be retained in the bucket,
    removing one of the retained predetermined number of paths from the bucket, and
    retaining, in place of the removed one of the retained predetermined number of paths, the further path in the bucket.

6. The network sampling based path decomposition and anomaly detection system according to claim 5, wherein the master network graph sampler is to determine whether the further path is to be retained in the bucket by
  determining a probability related to the further path and the retained predetermined number of paths, and
  in response to a determination that the probability related to the further path and the retained predetermined number of paths meets a predetermined probability threshold, retaining the further path in the bucket.

7. The network sampling based path decomposition and anomaly detection system according to claim 5, wherein the master network graph sampler is to remove the one of the retained predetermined number of paths from the bucket by
  randomly selecting the one of the retained predetermined number of paths from the bucket.

8. A method for network sampling based path decomposition and anomaly detection, the method comprising:
  evaluating, by at least one hardware processor, computer-generated log file data to generate a master network graph that specifies known events and transitions between the known events;
  decomposing, by the at least one hardware processor, the master network graph to generate a representative network graph that includes a reduced number of paths of the master network graph, wherein the reduced number of paths are selected with respect to probabilities of occurrence of the paths in the master network graph;
  monitoring, by the at least one hardware processor, a source to determine a cyber security threat by
    receiving incoming log file data related to the source,
    comparing the incoming log file data related to the source to the representative network graph, and
    determining, based on the comparison of the incoming log file data related to the source to the representative network graph, an anomaly in the representative network graph; and
  modifying, by the at least one hardware processor, an operational characteristic of the source based on the anomaly in the representative network graph by at least one of
    disconnecting the source from a network associated with the source by at least one of
      modifying a routing table associated with the source, or
      performing a statistical operation to compensate for activity from other systems in the network, wherein the operational characteristic related to disconnection of the source from the network includes a communication characteristic of the source with the network, or
    performing a remedial measure that is selected from a set of remedial measures based on the anomaly in the representative network graph, wherein the operational characteristic related to performance of the remedial measure includes at least one of
      increasing or decreasing bandwidth associated with the source, or
      blocking specified traffic to the source.

9. The method of claim 8, further comprising:
  generating, by the at least one hardware processor, based on the monitoring, a report indicative of the cyber security threat based on the anomaly in the representative network graph.

10. The method of claim 8, wherein decomposing the master network graph to generate the representative network graph that includes the reduced number of paths of the master network graph further comprises:
  sampling the master network graph to generate the representative network graph that includes the reduced number of paths of the master network graph.

11. The method of claim 8, wherein decomposing the master network graph to generate the representative network graph that includes the reduced number of paths of the master network graph further comprises:
  determining a sample size;
  executing, based on the sample size, a depth-first search on the master network graph; and
  retaining, based on the sample size, a predetermined number of paths that are located in the master network graph in a bucket.

12. The method of claim 11, wherein decomposing the master network graph to generate the representative network graph that includes the reduced number of paths of the master network graph further comprises:
  determining a further path after retaining the predetermined number of paths that are located in the master network graph;
  determining whether the further path is to be retained in the bucket; and
  in response to a determination that the further path is to be retained in the bucket
    removing one of the retained predetermined number of paths from the bucket, and
    retaining, in place of the removed one of the retained predetermined number of paths, the further path in the bucket.

13. The method of claim 12, wherein determining whether the further path is to be retained in the bucket further comprises:
  determining a probability related to the further path and the retained predetermined number of paths; and
  in response to a determination that the probability related to the further path and the retained predetermined number of paths meets a predetermined probability threshold, retaining the further path in the bucket.

14. A non-transitory computer readable medium having stored thereon machine readable instructions for network sampling based path decomposition and anomaly detection, the machine readable instructions when executed cause a processor to:
  receive a master network graph that specifies known events and transitions between the known events;
  decompose the master network graph to generate a representative network graph that includes a reduced number of paths of the master network graph, wherein the reduced number of paths are selected with respect to probabilities of occurrence of the paths in the master network graph;

receive incoming log file data related to a source;

compare the incoming log file data related to the source to the representative network graph;

determine, based on the comparison of the incoming log file data related to the source to the representative network graph, an anomaly in the representative network graph; and modify an operational characteristic of the source based on the anomaly in the representative network graph by at least one of disconnecting the source from a network associated with the source by at least one of modifying a routing table associated with the source, or performing a statistical operation to compensate for activity from other systems in the network, wherein the operational characteristic related to disconnection of the source from the network includes a communication characteristic of the source with the network, or performing a remedial measure that is selected from a set of remedial measures based on the anomaly in the representative network graph, wherein the operational characteristic related to performance of the remedial measure includes at least one of increasing or decreasing bandwidth associated with the source, or blocking specified traffic to the source.

15. The non-transitory computer readable medium of claim 14, wherein the machine readable instructions to decompose the master network graph to generate the representative network graph that includes the reduced number of paths of the master network graph further comprise machine readable instructions when executed further cause the processor to:

determine a sample size;

execute, based on the sample size, a depth-first search on the master network graph; and retain, based on the sample size, a predetermined number of paths that are located in the master network graph in a bucket.

16. The non-transitory computer readable medium of claim 15, wherein the machine readable instructions to decompose the master network graph to generate the representative network graph that includes the reduced number of paths of the master network graph further comprise machine readable instructions when executed further cause the processor to:

determine a further path after retaining the predetermined number of paths that are located in the master network graph;

determine whether the further path is to be retained in the bucket; and in response to a determination that the further path is to be retained in the bucket remove one of the retained predetermined number of paths from the bucket, and retain, in place of the removed one of the retained predetermined number of paths, the further path in the bucket.

17. The non-transitory computer readable medium of claim 16, wherein the machine readable instructions to determine whether the further path is to be retained in the bucket further comprise machine readable instructions when executed further cause the processor to:

determine a probability related to the further path and the retained predetermined number of paths; and in response to a determination that the probability related to the further path and the retained predetermined number of paths meets a predetermined probability threshold, retain the further path in the bucket.

18. The non-transitory computer readable medium of claim 15, wherein the predetermined number of paths that are located in the master network graph is equal to the sample size.

19. The non-transitory computer readable medium of claim 14, wherein the machine readable instructions when executed further cause the processor to:

generate a report indicative of a cyber security threat based on the anomaly in the representative network graph.

20. The non-transitory computer readable medium of claim 16, wherein the machine readable instructions to remove the one of the retained predetermined number of paths from the bucket further comprise machine readable instructions when executed further cause the processor to:

randomly select the one of the retained predetermined number of paths from the bucket.

* * * * *